Aug. 9, 1949.  Z. F. DAVIS  2,478,655
FISHING LURE
Filed Dec. 16, 1947
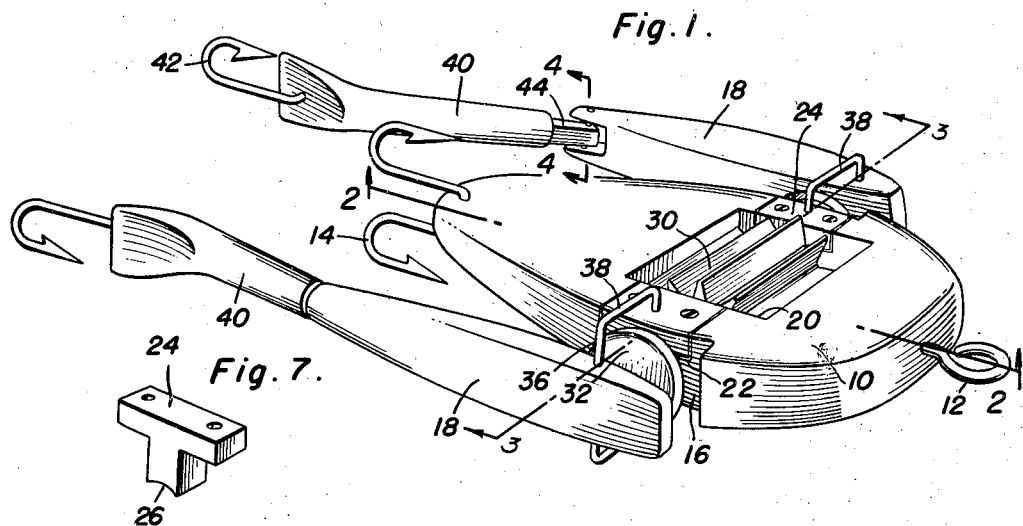
Fig. 1.
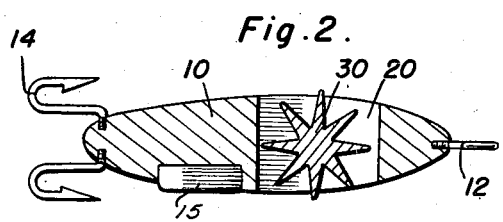
Fig. 7.
Fig. 2.
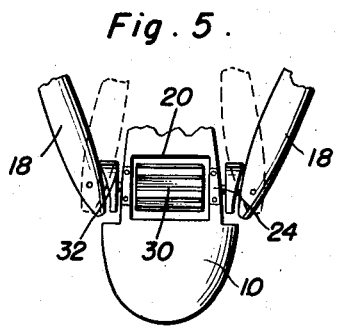
Fig. 5.
Fig. 3.
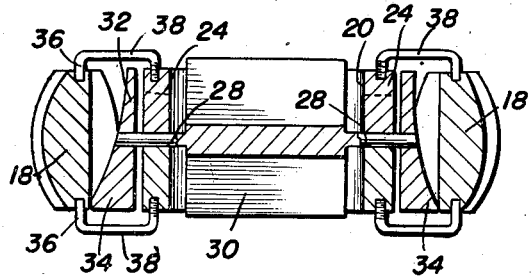
Fig. 4.
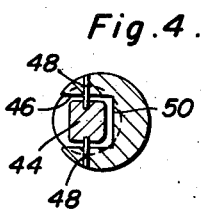
Fig. 6.
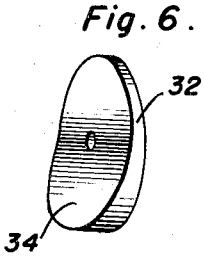
Zeb F. Davis
INVENTOR.
BY
Attorneys Patented Aug. 9, 1949

2,478,655

UNITED STATES PATENT OFFICE 2,478,655

FISHING LURE

Zeb F. Davis, Candler, N. C.

Application December 16, 1947, Serial No. 791,998

4 Claims. (Cl. 43—42.01)

This invention comprises novel and useful improvements in a fishing lure and more specifically pertains to a floating lure having articulated members which are movable to closely simulate the motions of a frog or similar live fish bait.

The principal object of this invention resides in providing an animated fishing lure wherein the movement of the articulated parts thereof is caused by motion of the lure through the water.

An important feature of the invention resides in providing a fishing lure having articulated members secured to the sides thereof, which articulated members are operated by automatic means responsive to motion of the lure through the water for causing oscillation of the articulated members.

A further important feature of the invention resides in the provision of an animated fishing lure wherein a paddle wheel is rotatably mounted in a recess or vertical slot in the body of the lure, together with means for causing oscillation of the members in response to rotation of the paddle wheel.

A further important feature of the invention resides in the provision of a fishing lure in accordance with the preceding objects and features wherein there is provided cam actuating means attached to the paddle wheel for positively effecting oscillation of the articulated members in both directions about a vertical hinge pin.

And a final important feature of the invention to be specifically enumerated herein, resides in the provision of a fishing lure in conformity with the above mentioned objects and features wherein the mechanism for oscillating the articulated members may be readily attached to or removed from the lure.

These, together with various ancillary objects and features of the invention which will later become apparent as the following description proceeds, are attained by this device, a preferred embodiment of which is illustrated by way of example only in the accompanying drawings, wherein:

Figure 1 is a perspective view showing a preferred embodiment of the invention;

Figure 2 is a vertical longitudinal sectional view through the body of the lure shown in Figure 1 and taken substantially upon the plane of the section line 2—2 thereof;

Figure 3 is a vertical transverse sectional detail view taken through the body of the lure substantially upon the plane of the section line 3—3 of Figure 1;

Figure 4 is a detail view taken in vertical transverse section through one of the articulated joints of an oscillating member of the lure, and this taken substantially upon the vertical plane illustrated by the section line 4—4 of Figure 1;

Figure 5 is a fragmentary top plan view showing a portion of the body of the lure and of the oscillating members hingedly connected thereto, alternative positions of the members being indicated in dotted line therein;

Figure 6 is a perspective view of one of the cam actuating members of the device; and, Figure 7 is a perspective view of an element forming a part of the invention.

Referring now more specifically to the accompanying drawings, wherein like numerals designate similar parts throughout the various views, 10 indicates the body of a fishing lure which is preferably formed of any suitable material of a floating nature, this body being provided with a fastening ring 12 at the front end thereof for attachment to a fishing line or the like, and with a hook element 14 at the rear end thereof upon which suitable bait may be disposed. The body is provided at its rear undersurface with a medially disposed weight 15, shown in Figure 2.

In accordance with this invention, the sides of the body float 10 are recessed and cut away as at 16 to accommodate the forward ends of the oscillatable members 18, as set forth hereinafter. A transversely extending slot or aperture 20 is disposed entirely through the floating body 10, and the sides of the body at the ends of the slot 20 are recessed from the upper surface thereof as at 22 to provide bearing recesses which are closed by bearing caps of generally T-shaped configuration as indicated at 24 in Figure 7. The upper or cross-arm of the T-shaped member 24 is proportioned to extend substantially flush from the upper surface of the body 10, while the depending leg portion of the T-shaped member is snugly received in the recess 22, and at its lower end is concavely shaped as at 26 to from a bearing cap for the laterally extending axle members 28, which are journalled therein.

These axle members as indicated in Figure 3, are integral with and extend from opposite sides of a paddle wheel 30 which is thereby mounted in rotatable fashion in the slot 20, in sufficient relation to have its lower portion extending below the bottom surface of the float 10, whereby the paddles of the paddle wheel may be rotated as the lure is drawn through the water.

Non-rotatably but detachably secured to the outer ends of the axles 28 where they extend beyond the sides of the float body 10, and into the recessed portions 16 at the sides of the body, are generally cylindrical cam members 32 provided with at least one axial cam lobe 34 thereon. As shown best in Figures 1 and 3, the oscillating members 18 are pivoted for movement about a vertical axis, by means of the downwardly turned arms of hinge pins 36 which are appropriately journalled in alignment with each other in the upper and lower surfaces of the oscillating member 18, and which are connected by upper and lower bracket members or extensions 38, whose supporting ends are inturned in alignment with each other and are seated in the upper surface of the T-shaped member 24 and in the bottom surface of the float 10. The axis of the paddle wheel and axle is aligned with and intersects the vertical axis of the hinge of the members 18, whereby the axial cam 34 alternately engages the inner surface of the member 18 forwardly and rearwardly of its hinge pin to positively actuate the same.

The two cam members 32 on the opposite sides of the float body 10, may be positioned at any desired angular relation with respect to each other, whereby the oscillating members 18 may move outwardly simultaneously, or one may lead the other as preferred.

During this oscillation of the members 18, it will be noted that the front end thereof is receivable in the lateral recess 16, with the actuating portion 34 of the cam disposed rearwardly of the hinge pin.

Preferably, the oscillating members 18 consist of two articulated elements, the front element indicated by the numeral 18, and a rear element 40 whose rearmost end is provided with a hook 42 to which any suitable bait may be attached. At its forward end, the element 40 is provided with a reduced forward extension 44 which is loosely received within a socket 46 and retained therein by vertical fulcrum pins 48 for oscillation about a vertical axis. The construction of this articulated joint is best shown in the detailed view of Figure 4. In order to limit the relative movement of the rear section or element 40 with reference to the front element 18, in one direction of movement, the socket 46 is provided with a closed side wall 50, the other or inner wall of the socket being opened as shown in Figure 1. This closed wall constitutes an abutment engaging the member 44 for limiting its outward movement relative to the front section 18.

Preferably, the float body 10 is contoured, and colored to simulate an acceptable type of bait such as a frog or the like, while the oscillatable members 18 are simulations of the legs of a frog, whereby as the device is moved through the water and the paddle wheel is rotated by means of the depending paddles engaging the water, the cam mechanism causes the leg members 18 to oscillate and the articulated members 40 to move erratically in close simulation of the kicking action of a frog.

From the foregoing, the manner of operating, constructing and employing the invention will be readily understood and accordingly, further explanation is believed to be unnecessary.

However, since numerous modifications will readily occur to those skilled in the art after a consideration of the foregoing specification and annexed drawings, it is not intended to limit the invention to the exact construction shown and described, and accordingly, all suitable modifications and equivalents may be resorted to falling within the scope of the appended claims.

Having described the invention what is claimed as new is:

1. A fish lure comprising a float, a member hinged to said float, a hook carried by said float, means for oscillating said member comprising a paddle wheel journalled on said float, and a cam attached to said paddle wheel, said member engaging said cam for actuation thereby, said float being provided with an opening extending vertically therethrough, said paddle wheel being mounted in said opening, and positioned to extend therebeneath.

2. The combination of claim 1 wherein said paddle wheel is provided with an axle, said cam being mounted on said axle.

3. A fish lure comprising a float having a vertical slot extending therethrough, a pair of members hinged to said float at opposite sides thereof for oscillatory movement laterally thereof, an axle transversely of said float, the upper surface of said float having bearing recesses for journalling said axle, bearing caps for retaining said axle in said bearing recesses, a paddle wheel secured to said axle and mounted in said slot, and cams rigidly secured to said axle, said cams engaging said members for oscillation thereof in response to rotation of said paddle.

4. The combination of claim 3 wherein said members have vertical hinge pins, the upper end of said pins being supported by said bearing caps and the lower ends being attached to said float.

ZEB F. DAVIS.

REFERENCES CITED

The following references are of record in the file of this patent:

UNITED STATES PATENTS

| Number | Name | Date |
|---|---|---|
| 1,390,601 | Caldwell | Sept. 13, 1921 |
| 1,627,512 | Highes et al. | May 3, 1927 |